(12) United States Patent
Krishnan et al.

(10) Patent No.: US 7,463,576 B2
(45) Date of Patent: Dec. 9, 2008

(54) CHANNEL ESTIMATION FOR OFDM COMMUNICATION SYSTEMS

(75) Inventors: Ranganathan Krishnan, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 11/101,908

(22) Filed: Apr. 7, 2005

(65) Prior Publication Data
US 2005/0170783 A1 Aug. 4, 2005

Related U.S. Application Data

(63) Continuation of application No. 10/340,130, filed on Jan. 10, 2003, now Pat. No. 7,039,001.
(60) Provisional application No. 60/442,362, filed on Oct. 29, 2002, provisional application No. 60/422,368, filed on Oct. 29, 2002.

(51) Int. Cl.
*H04J 11/00* (2006.01)
(52) U.S. Cl. ............... 370/203; 370/208; 370/210; 370/329; 370/344; 370/207; 370/342; 370/335; 375/260; 375/340; 375/316; 375/347; 375/296; 455/67.11; 455/67.16; 455/63.1
(58) Field of Classification Search ............... 370/203, 370/210, 342, 347, 348, 480, 335, 208, 329, 370/340, 344; 455/450, 452.1; 375/340, 375/346, 347
See application file for complete search history.

(56) References Cited

U.S. PATENT DOCUMENTS 5,511,233 A 4/1996 Otten 6,104,926 A 8/2000 Hogg et al.

(Continued)

FOREIGN PATENT DOCUMENTS

DE 19701011 6/1998

(Continued)

OTHER PUBLICATIONS

International Search Report - PCT/US03/034506-International Search Authority -United States, Apr. 9, 2004.
International Search Report PCT/US03/034507—International Search Authority—United States Patent Office Mar. 26, 2004.

*Primary Examiner*—Marceau Milord
(74) *Attorney, Agent, or Firm*—Sandip S. Minhas; Peng Zhu; Thomas R. Rouse

(57) ABSTRACT

Techniques to estimate the frequency response of a wireless channel in an OFDM system. In one method, an initial estimate of the frequency response of the wireless channel is obtained for a first group of subbands based on a pilot transmission received via the subbands in the first group. An estimate of the impulse response of the wireless channel is then derived based on the initial frequency response estimate. An enhanced estimate of the frequency response of the wireless channel is then derived for a second group of subbands based on the impulse response estimate. The first and second groups may each include all or only a subset of the usable subbands. Subband multiplexing may be used to allow simultaneous pilot transmissions by multiple terminals on their associated groups of subbands.

16 Claims, 5 Drawing Sheets

U.S. PATENT DOCUMENTS

| | | | |
|---|---|---|---|
| 6,430,412 B1 | 8/2002 | Hogg et al. | |
| 6,430,724 B1 | 8/2002 | Laneman et al. | |
| 6,449,245 B1 * | 9/2002 | Ikeda et al. | 370/208 |
| 6,473,393 B1 * | 10/2002 | Ariyavisitakul et al. | 370/203 |
| 6,477,210 B2 * | 11/2002 | Chuang et al. | 375/340 |
| 6,487,235 B2 | 11/2002 | Hoole | |
| 6,532,256 B2 | 3/2003 | Miller | |
| 6,535,715 B2 | 3/2003 | Dapper et al. | |
| 6,545,997 B1 | 4/2003 | Bohnke et al. | |
| 6,549,561 B2 | 4/2003 | Crawford | |
| 6,563,858 B1 * | 5/2003 | Fakatselis et al. | 375/148 |
| 6,567,374 B1 | 5/2003 | Bohnke et al. | |
| 6,594,320 B1 * | 7/2003 | Sayeed | 375/281 |
| 6,597,745 B1 | 7/2003 | Dowling | |
| 6,603,801 B1 | 8/2003 | Andren et al. | |
| 6,618,454 B1 | 9/2003 | Agrawal et al. | |
| 6,633,616 B2 * | 10/2003 | Crawford | 375/326 |
| 6,636,568 B2 | 10/2003 | Kadous | |
| 6,643,281 B1 | 11/2003 | Ryan | |
| 6,654,429 B1 * | 11/2003 | Li | 375/316 |
| 6,661,832 B1 | 12/2003 | Sindhushayana et al. | |
| 6,674,792 B1 * | 1/2004 | Sugita | 375/148 |
| 6,700,865 B1 * | 3/2004 | Yamamoto et al. | 370/208 |
| 6,731,614 B1 | 5/2004 | Ohlson et al. | |
| 6,751,187 B2 * | 6/2004 | Walton et al. | 370/210 |
| 6,928,062 B2 * | 8/2005 | Krishnan et al. | 370/329 |
| 6,977,974 B1 * | 12/2005 | Geraniotis et al. | 375/340 |
| 6,990,142 B2 | 1/2006 | Chappaz | |
| 6,996,195 B2 * | 2/2006 | Kadous | 375/341 |
| 7,020,110 B2 * | 3/2006 | Walton et al. | 370/334 |
| 7,027,429 B2 * | 4/2006 | Laroia et al. | 370/350 |
| 7,027,523 B2 * | 4/2006 | Jalali et al. | 375/296 |
| 7,039,001 B2 * | 5/2006 | Krishnan et al. | 370/203 |
| 7,039,004 B2 * | 5/2006 | Sun et al. | 370/208 |
| 7,058,134 B2 * | 6/2006 | Sampath | 375/260 |
| 7,072,413 B2 * | 7/2006 | Walton et al. | 375/267 |
| 7,092,459 B2 * | 8/2006 | Sendonaris | 375/326 |
| 7,139,320 B1 * | 11/2006 | Singh et al. | 375/260 |

FOREIGN PATENT DOCUMENTS

| | | |
|---|---|---|
| DE | 19747369 | 5/1999 |
| GB | 2350753 | 12/2000 |
| RU | 2150174 | 5/2000 |
| WO | 04040813 | 5/2004 |

* cited by examiner

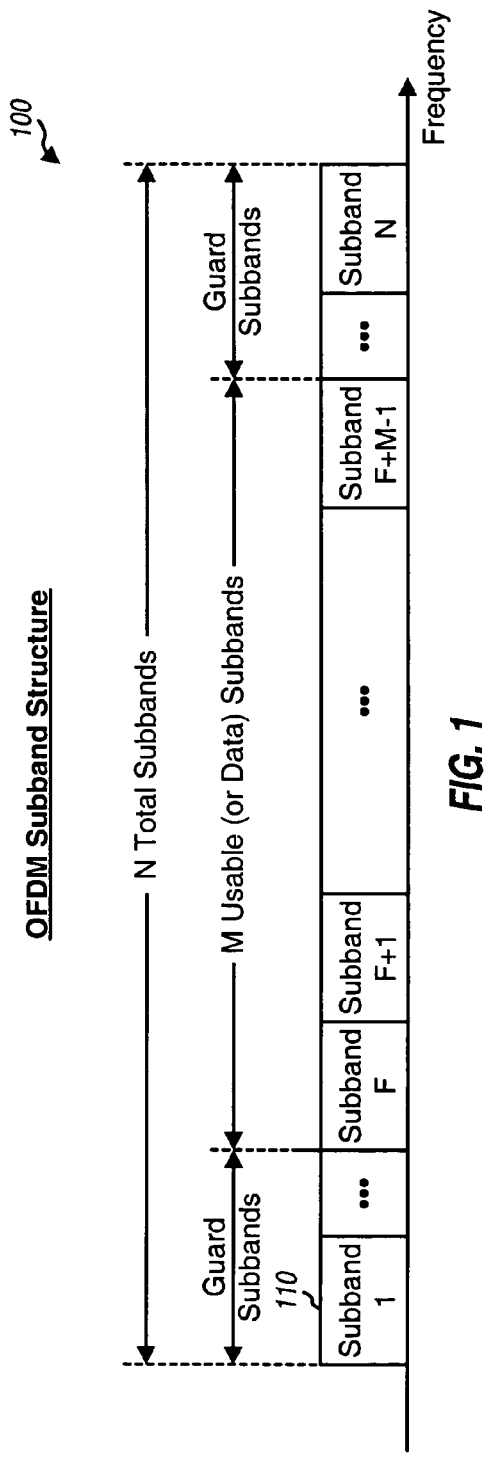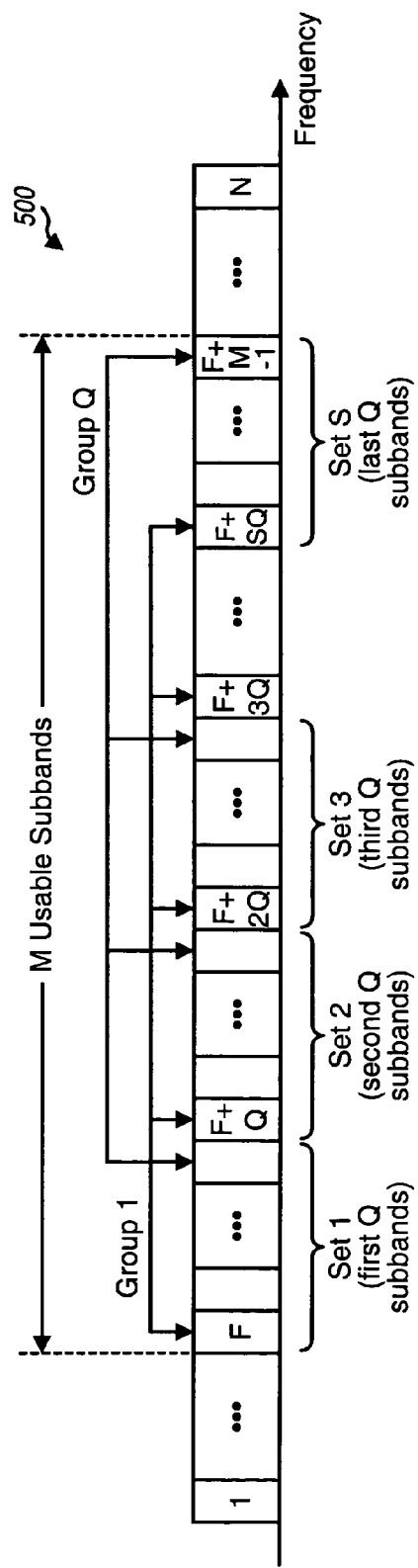

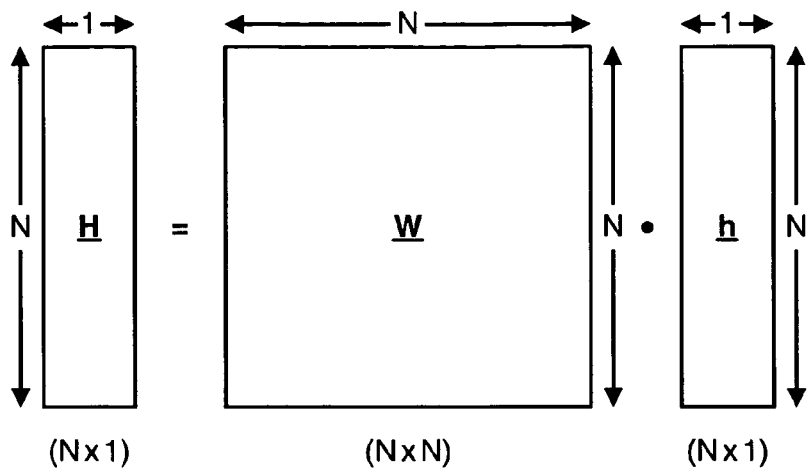
FIG. 2A
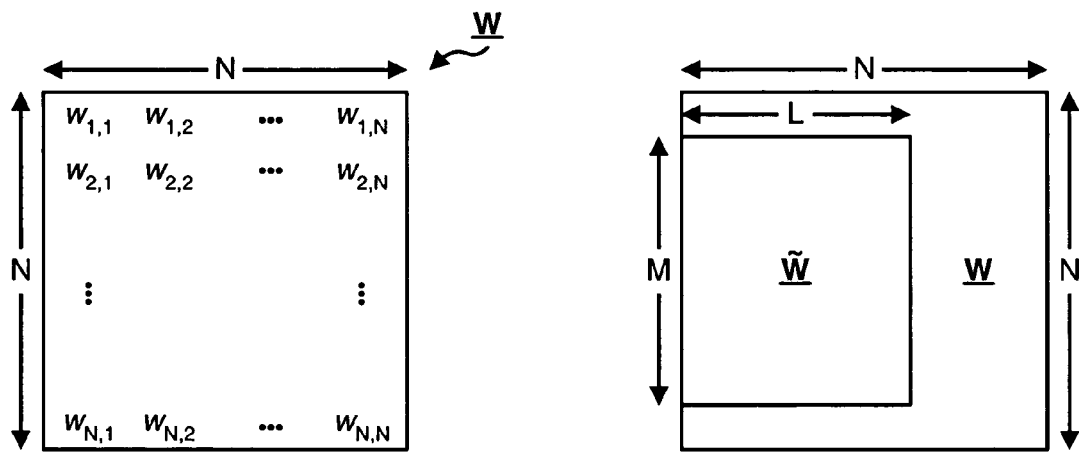
FIG. 2B
FIG. 3A
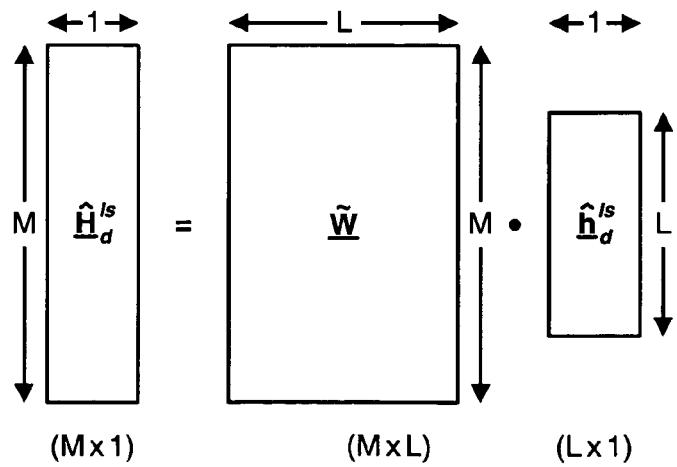
FIG. 3B

CHANNEL ESTIMATION FOR OFDM COMMUNICATION SYSTEMS

CLAIM OF PRIORITY UNDER 35 U.S.C. §120

The present Application for patent is a Continuation and claims priority to patent application Ser. No. 10/340,130 entitled "CHANNEL ESTIMATION FOR OFDM COMMUNICATION SYSTEMS" filed Jan. 10, 2003, now U.S. Pat. No. 7,039,001 now allowed, and assigned to the assignee hereof and hereby expressly incorporated by reference herein.

RELATED APPLICATIONS

This application claims priority and is related to both U.S. Provisional Patent Application Ser. No. 60/422,362, filed Oct. 29, 2002, entitled "Channel Estimation For OFDM Communication Systems," and to U.S. Provisional Patent Application Ser. No. 60/422,368, entitled "Uplink Pilot And Signaling Transmission In Wireless Communication Systems," which are incorporated herein by reference in its entirety for all purposes.

BACKGROUND

I. Field of the Invention

The present invention relates generally to data communication, and more specifically to techniques for estimating the response of a wireless channel in a communication system with multiple subbands, such as an orthogonal frequency division multiplexing (OFDM) system.

II. Background

Wireless communication systems are widely deployed to provide various types of communication such as voice, packet data, and so on. These systems may be multiple-access systems capable of supporting communication with multiple users by sharing the available system resources. Examples of such multiple-access systems include code division multiple access (CDMA) systems, time division multiple access (TDMA) systems, and orthogonal frequency division multiple access (OFDMA) systems.

OFDM effectively partitions the overall system bandwidth into a number of (N) orthogonal subbands. These subbands are also referred to as tones, frequency bins, and frequency subchannels. With OFDM, each subband is associated with a respective subcarrier upon which data may be modulated. Each subband may thus be viewed as an independent transmission channel that may be used to transmit data.

In a wireless communication system, an RF modulated signal from a transmitter may reach a receiver via a number of propagation paths. For an OFDM system, the N subbands may experience different effective channels due to different effects of fading and multipath and may consequently be associated with different complex channel gains.

An accurate estimate of the response of the wireless channel between the transmitter and the receiver is normally needed in order to effectively transmit data on the available subbands. Channel estimation is typically performed by sending a pilot from the transmitter and measuring the pilot at the receiver. Since the pilot is made up of symbols that are known a priori by the receiver, the channel response can be estimated as the ratio of the received pilot symbol over the transmitted pilot symbol for each subband used for pilot transmission.

Pilot transmission represents overhead in the OFDM system. Thus, it is desirable to minimize pilot transmission to the extent possible. However, because of noise and other artifacts in the wireless channel, a sufficient amount of pilot needs to be transmitted in order for the receiver to obtain a reasonably accurate estimate of the channel response. Moreover, the pilot transmissions need to be repeated to account for variations in the channel over time due to fading and changes in the multipath constituents. Consequently, channel estimation for an OFDM system normally consumes a noticeable portion of the system resources.

In the downlink of a wireless communication system, a single pilot transmission from an access point (or a base station) can be used by a number of terminals to estimate the response of the distinct downlink channels from the access point to each of the terminals. However, in the uplink, each terminal needs to send a pilot transmission separately in order to enable the access point to estimate the uplink channel from the terminal to the access point. Consequently, the overhead due to pilot transmissions is exacerbated due to uplink pilot transmissions.

There is therefore a need in the art for techniques to more efficiently estimate the channel response in an OFDM system, particularly in the uplink.

SUMMARY

Techniques are provided herein to estimate the frequency response of a wireless channel in a communication system with multiple subbands (e.g., an OFDM system). It is recognized that the impulse response of the wireless channel can be characterized by L taps, where L is typically much less than the N total subbands in the OFDM system. Because only L taps is needed for the channel impulse response, the frequency response of the wireless channel lies in a subspace of dimension L (instead of N) and may be fully characterized based on the channel gains for as few as L appropriately selected subbands (instead of all N subbands). Moreover, even when more than L channel gains are available, the property described above may be used to obtain an enhanced estimate of the frequency response of the wireless channel by suppressing the noise components outside this subspace, as described below.

In one embodiment, a method is provided for estimating the frequency response of the wireless channel (e.g., in the OFDM system). In accordance with the method, an initial estimate of the frequency response of the wireless channel is obtained for a first group of subbands based on a pilot transmission received via the subbands in the first group. The first group may include all or only a subset of the subbands usable for data transmission. An estimate of the impulse response of the wireless channel is then derived based on the initial frequency response estimate and a first discrete Fourier transform (DFT) matrix for the subbands in the first group. The impulse response estimate may be derived as a least square estimate, as described below. An enhanced estimate of the frequency response of the wireless channel is then derived for a second group of subbands based on the impulse response estimate and a second DFT matrix for the subbands in the second group. The second group may include all or a subset of the usable subbands, and would include at least one additional subband not included in the first group if this first group does not include all usable subbands.

Various aspects and embodiments of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein:

FIG. 1 shows an OFDM subband structure;

FIG. 2A shows the relationship between the frequency response and the impulse response of a wireless channel;

FIG. 2B shows a DFT matrix for the N total subbands in the OFDM system;

FIG. 3A shows the relationship between the DFT matrices for the M usable subbands and the N total subbands in the OFDM system;

FIG. 3B shows derivation of an enhanced frequency response estimate based on an impulse response estimate derived from pilot transmission on the M usable subbands;

FIG. 5 shows an OFDM subband structure that supports subband multiplexing;

DETAILED DESCRIPTION

Figure 4A:
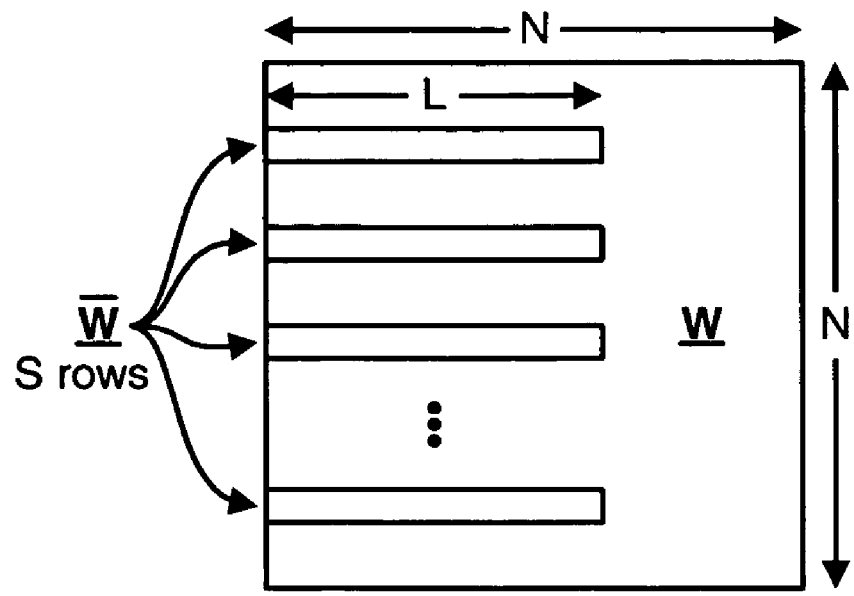
FIG. 4A shows the relationship between the DFT matrices for S assigned subbands and the N total subbands.

The channel estimation techniques described herein may be used for any communication system with multiple subbands. For clarity, these techniques are described for an OFDM system.

FIG. 1 shows a subband structure 100 that may be used for an OFDM system. The OFDM system has an overall system bandwidth of W MHz, which is partitioned into N orthogonal subbands using OFDM. Each subband has a bandwidth of W/N MHz. In a typical OFDM system, only M of the N total subbands are used for data transmission, where M<N. These M usable subbands are also referred to as data subbands. The remaining N-M subbands are not used for data transmission and serve as guard subbands to allow the OFDM system to meet spectral mask requirements. The M usable subbands include subbands F through F+M−1.

For OFDM, the data to be transmitted on each subband is first modulated (i.e., symbol mapped) using a particular modulation scheme selected for use for that subband. The signal value is set to zero for each of the N-M unused subbands. For each symbol period, the N symbols (i.e., the M modulation symbols and N-M zeros) are transformed to the time domain using an inverse fast Fourier transform (IFFT) to obtain a "transformed" symbol that includes N time-domain samples. The duration of each transformed symbol is inversely related to the bandwidth of each subband. For example, if the system bandwidth is W=20 MHz and N=256, then the bandwidth of each subband is 78.125 KHz (or W/N MHz) and the duration of each transformed symbol is 12.8 μsec (or N/W μsec).

OFDM can provide certain advantages, such as the ability to combat frequency selective fading, which is characterized by different channel gains at different frequencies of the overall system bandwidth. It is well known that frequency selective fading is accompanied by inter-symbol interference (ISI), which is a phenomenon whereby each symbol in a received signal acts as distortion to subsequent symbols in the received signal. The ISI distortion degrades performance by impacting the ability to correctly detect the received symbols. Frequency selective fading can be conveniently combated with OFDM by repeating a portion of (or appending a cyclic prefix to) each transformed symbol to form a corresponding OFDM symbol, which is then transmitted over a wireless channel.

The length of the cyclic prefix (i.e., the amount to repeat) for each OFDM symbol is dependent on the delay spread of the system. The delay spread for a given transmitter is the difference between the earliest and latest arriving signal instances at a receiver for a signal transmitted by the transmitter. The delay spread of the system is the expected worst-case delay spread for all terminals in the system. To effectively combat ISI, the cyclic prefix should be longer than the delay spread of the system.

Each transformed symbol has a duration of N sample periods, where each sample period has a duration of (1/W) μsec. The cyclic prefix may be defined to include Cp samples, where Cp is a suitable integer selected based on the delay spread of the system. In particular, Cp is selected to be greater than or equal to the number of taps (L) for the impulse response of the wireless channel (i.e., Cp≧L). In this case, each OFDM symbol would include N+Cp samples, and each symbol period would span N+Cp sample periods.

The N subbands of the OFDM system may experience different channel conditions (i.e., different effects due to fading and multipath) and may be associated with different complex channel gains. An accurate estimate of the channel response is normally needed in order to properly process (e.g., decode and demodulate) data at the receiver.

The wireless channel in the OFDM system may be characterized by either a time-domain channel impulse response, h, or a corresponding frequency-domain channel frequency response, H. The channel frequency response H is the discrete Fourier transform (DFT) of the channel impulse response h. This relationship may be expressed in matrix form, as follows:

$$H = Wh \qquad \text{Eq (1)}$$

where h is an (N×1) vector for the impulse response of the wireless channel between the transmitter and the receiver in the OFDM system;

H is an (N×1) vector for the frequency response of the wireless channel; and

W is an (N×N) matrix used to perform the DFT on the vector h to obtain the vector H.

The matrix W is defined such that the (n,m)-th entry, $W_{n,m}$, is given as:

$$w_{n,m} = \frac{1}{\sqrt{N}} e^{-j2\pi \frac{(n-1)(m-1)}{N}}, \qquad \text{Eq (2)}$$

for $n \in \{1 \ldots N\}$ and $m \in \{1 \ldots N\}$.

The vector h includes one non-zero entry for each tap of the channel impulse response. Thus, if the channel impulse response includes L taps, where L<N, then the first L entries of the vector h would be L non-zero values and the (N−L) following entries would be zeros. However, the techniques described herein apply equally even if the L non-zero values are some arbitrary selection within the N entries in the vector h, although such a scenario may not arise in real systems.

FIG. 2A graphically shows the relationship between the channel frequency response H and the channel impulse response h. The vector h includes N time-domain values for the impulse response of the wireless channel from the transmitter to the receiver. This vector h can be transformed to the frequency domain by pre-multiplying it with the DFT matrix W. The vector H includes N frequency-domain values for the complex channel gains of the N subbands.

FIG. 2B graphically shows the matrix W, which is an (N×N) matrix comprised of the elements defined in equation (2).

Techniques are provided herein to obtain an enhanced estimate of the frequency response of the wireless channel in the OFDM system. It is recognized that the impulse response of the wireless channel can be characterized by L taps, where L is typically much less than the number of total subbands in the system (i.e., L<N). That is, if an impulse is applied to the wireless channel by the transmitter, then L time-domain samples (at the sample rate of W) would be sufficient to characterize the response of the wireless channel based on this impulse stimulus. The number of taps L for the channel impulse response is dependent on the delay spread of the system, with a longer delay spread corresponding to a larger value for L.

Because only L taps are needed for the channel impulse response, the channel frequency response H lies in a subspace of dimension L (instead of N). More specifically, the frequency response of the wireless channel may be fully characterized based on the channel gains for as few as L appropriately selected subbands, instead of all N subbands. Even if more than L channel gains are available, an enhanced estimate of the frequency response of the wireless channel may be obtained by suppressing the noise components outside this subspace, as described below.

The model for the OFDM system may be expressed as:

$$r = H \circ x + n, \quad \text{Eq (3)}$$

where
r is a "receive" vector with N entries for the symbols received on the N subbands;
x is a "transmit" vector with N entries for the symbols transmitted on the N subbands (the entries for the unused subbands are zeros);
n is a vector with entries for additive white Gaussian noise (AWGN) received on the N subbands; and
"∘" denotes the Hadmard product (i.e., a point-wise product, where the i-th element of r is the product of the i-th elements of x and H).

The noise n is assumed to have zero mean and a variance of $\sigma^2$.

The channel estimation techniques described herein may be used in conjunction with various pilot transmission schemes. For clarity, these techniques are described for two specific pilot transmission schemes.

In a first pilot transmission scheme, pilot symbols are transmitted on each of the M data subbands. The transmitted pilot may be denoted by an (M×1) vector $x_d$, which includes a specific pilot symbol for each of the M data subbands. The transmit power for the pilot symbol for each data subband may be expressed as $P_k = x_k^2$, where $x_k$ is the pilot symbol transmitted on the k-th subband.

A receive vector $r_d$ may be expressed for the received pilot, similar to that shown in equation (1). More specifically, $r_d = H_d \circ x_d + n_d$, where $r_d$, $H_d$, $x_d$, and $n_d$ are (M×1) vectors that include only M entries of the (N×1) vectors r, H, x, and n, respectively. These M entries correspond to the M data subbands.

An initial estimate of the frequency response of the wireless channel, $\hat{H}_d$, may be expressed as:

$$\hat{H}_d = r_d / x_d = H_d + n_d / x_d, \quad \text{Eq (4)}$$

where $\hat{H}_d$ is an (M×1) vector for the initial channel frequency response estimate, and $a_d/b_d = [a_1/b_1, a_2/b_2 \ldots a_M/b_M]^T$, which includes M ratios for the M data subbands.

As shown in equation (4), the initial estimate $\hat{H}_d$ may be determined by the receiver based on the received and transmitted pilot symbols for each of the M data subbands. The initial estimate $\hat{H}_d$ is indicative of the frequency response of the wireless channel for the M data subbands.

As seen from equation (4), the initial estimate $\hat{H}_d$ is distorted by a noise component $n_d/x_d$. An enhanced estimate may be obtained by observing that the channel frequency response $H_d$ is the discrete Fourier transform of the channel impulse response $h_d$, and that $h_d$ has L taps, where L is typically less than M (i.e., L<M).

A least square estimate of the impulse response of the wireless channel, $\hat{h}_d^{ls}$, may be obtained based on the following optimization:

$$\hat{h}_d^{ls} = \min_{h_j} \| \hat{H}_d - \tilde{W} h_j \|^2, \quad \text{Eq (5)}$$

where
$h_j$ is an (L×1) vector for a hypothesized impulse response of the channel,
$\tilde{W}$ is an (M×L) sub-matrix of the (N×N) matrix W, and
$\hat{h}_d^{ls}$ is an (L×1) vector for the least square channel impulse response estimate.

FIG. 3A graphically shows the relationship between the matrices $\tilde{W}$ and W. The M rows of the matrix $\tilde{W}$ are the M rows of the matrix W corresponding to the M data subbands. The L columns of the matrix $\tilde{W}$ are the first L columns of the matrix W.

The optimization in equation (5) is over all possible channel impulse responses $h_j$. The least square impulse response estimate $\hat{h}_d^{ls}$ is equal to the hypothesized impulse response $h_j$ that results in the minimum error between the initial frequency response estimate $\hat{H}_d$ and the frequency response corresponding to $h_j$, which is given by $\tilde{W} h_j$.

The solution to equation (5) may be expressed as:

$$\hat{h}_d^{ls} = (\tilde{W}^H \tilde{W})^{-1} \tilde{W}^H \hat{H}_d. \quad \text{Eq (6)}$$

As shown in equation (6), the least square impulse response estimate $\hat{h}_d^{ls}$ may be derived based on the initial frequency response estimate $\hat{H}_d$, which is obtained based on the pilot received on the M data subbands. In particular, the estimate $\hat{h}_d^{ls}$ may be obtained by performing a "least square operation" (i.e., a pre-multiplication with $(\tilde{W}^H \tilde{W})^{-1} \tilde{W}^H$) on the initial estimate $\hat{H}_d$. The vector $\hat{h}_d^{ls}$ includes L entries for the L taps of the channel impulse response, where L<M An enhanced estimate of the frequency response of the wireless channel, $\hat{H}_d^{ls}$, may then be derived from the least square channel impulse response estimate, $\hat{h}_d^{ls}$, as follows:

$$\hat{H}_d^{ls} = \tilde{W} \hat{h}_d^{ls}, \quad \text{Eq (7)}$$

where $\hat{H}_d^{ls}$ is an (M×1) vector for the enhanced channel frequency response estimate. Equation (7) indicates that the enhanced channel frequency response estimate $\hat{H}_d^{ls}$ may be obtained for all M data subbands based on the least square channel impulse response estimate $h_d^{ls}$ that includes only L entries, where L<M.

FIG. 3B graphically shows the relationship between the enhanced channel frequency response estimate $\hat{H}_d^{ls}$ and the least square channel impulse response estimate $h_d^{ls}$. The vector $h_d^{ls}$ includes L time-domain values for the least square channel impulse response estimate. This vector $h_d^{ls}$ can be transformed to the frequency-domain by pre-multiplying it with the matrix W. The resultant vector $\hat{H}_d^{ls}$ includes M frequency-domain values for the complex gains for the M data subbands.

For clarity, the channel estimation techniques are described above with three distinct steps:

1. Obtain the initial channel frequency response estimate $\hat{H}_d$;
2. Derive the least square channel impulse response estimate $h_d^{ls}$ based on the initial channel frequency response estimate $\hat{H}_d$; and
3. Derive the enhanced channel frequency response estimate $\hat{H}_d^{ls}$ based on the channel impulse response estimate $h_d^{ls}$.

The channel estimation may also be performed such that a step may be implicitly (instead of explicitly) performed. In particular, the enhanced channel frequency response estimate $\hat{H}_d^{ls}$ may be derived directly from the initial channel frequency response estimate $\hat{H}_d$, as follows:

$$\hat{H}_d^{ls} = \tilde{W}(\tilde{W}^H \tilde{W})^{-1} \tilde{W}^H \hat{H}_d \qquad \text{Eq (8)}$$

In equation (8), the second step is implicitly performed such that the enhanced frequency response estimate $\hat{H}_d^{ls}$ is derived based on the channel impulse response estimate $h_d^{ls}$ that is implicitly derived is based on the initial frequency response estimate $\hat{H}_d$.

The mean square error (MSE) in the enhanced channel frequency response estimate $\hat{H}_d^{ls}$ may be expressed as:

$$MSE = E\left[\left\|H_d - \hat{H}_d^{ls}\right\|^2\right] = E\left[\left\|\tilde{W}(\tilde{W}^H \tilde{W})^{-1} \tilde{W}^H n_d\right\|^2\right] \qquad \text{Eq (9)}$$
$$= \frac{\sigma^2}{P_d} \text{trace}\left[\tilde{W}(\tilde{W}^H \tilde{W})^{-1} \tilde{W}^H\right],$$
$$= \frac{\sigma^2 L}{P_d}$$

where $P_d$ is the transmit power used for the pilot symbol in each of the M data subbands.

It can be shown that the MSE in equation (9) is the trace of the noise covariance matrix after the least square operation (i.e., the covariance matrix of $W(W^H W)^{-1} W^H n_d$).

In a second pilot transmission scheme, pilot symbols are transmitted on each of S designated subbands, where S<N and S≧L. Typically, the number of designated subbands is less than the number of data subbands (i.e., S<M). In this case, the other (M−S) data subbands may be used for other transmissions. For example, on the downlink, the other (M−S) data subbands may be used to transmit traffic data and/or overhead data. On the uplink, the M data subbands may be partitioned into disjoint groups of S subbands, and each group may then be assigned to a different terminal for pilot transmission. This subband multiplexing, whereby multiple terminals transmit concurrently on disjoint groups of subbands, may be used to improve system efficiency. For clarity, channel estimation is described below for subband multiplexing whereby each designated terminal transmits a pilot only on its S assigned subbands.

The transmit pilot for each terminal may be denoted by an (S×1) vector $x_i$, which includes a specific pilot symbol for each of the S subbands assigned to the terminal. The transmit power for the pilot symbol for each assigned subband may be expressed as $P_{i,k} = x_{i,k}^2$, where $x_{i,k}$ is the pilot symbol transmitted on the k-th subband by terminal i.

An initial estimate of the frequency response of the wireless channel, $\hat{H}_i$, for terminal i may be expressed as:

$$\hat{H}_i = r_i/x_i = H_i + n_i/x_i, \qquad \text{Eq (10)}$$

where
$r_i$, $H_i$, $x_i$, and $n_i$ are (S×1) vectors that include only S entries of the (N×1) vectors r, H, x, and n, respectively, with these S entries corresponding to the S subbands assigned to terminal i; and
$\hat{H}_i$ is an (S×1) vector for the initial channel frequency response estimate for terminal i.

The initial estimate $\hat{H}_i$ may be determined by an access point for terminal i based on the received and transmitted pilot symbols for each of the S subbands assigned to the terminal. The initial estimate $\hat{H}_i$ is indicative of the frequency response of the wireless channel for the S subbands assigned to terminal i. Again, the initial estimate $\hat{H}_i$ is distorted by a noise component $n_i/x_i$. An enhanced channel estimate may be obtained for terminal i as follows.

A least square estimate of the impulse response of the wireless channel, $h_i^{ls}$ for terminal i may be obtained based on the following optimization:

$$\hat{h}_i^{ls} = \min_{h_j} \left\| \hat{H}_i - \overline{W}_i h_j \right\|^2, \qquad \text{Eq (11)}$$

where
$h_j$ is an (L×1) vector for a hypothesized channel impulse response,
$\overline{W}_i$ is an (S×L) sub-matrix of the (N×N) DFT W, and
$h_i^{ls}$ is an (L×1) vector for the least square channel impulse response estimate for terminal i.

FIG. 4A graphically shows the relationship between the matrices $\overline{W}_i$ and W. The S rows of the matrix $\overline{W}_i$ are the S rows of the matrix W corresponding to the S subbands assigned to terminal i (which are shown as the unshaded rows). The L columns of the matrix $\overline{W}_i$ are the first L columns of the matrix W. Since each terminal is assigned a different group of subbands for pilot transmission on the uplink, the matrix $\overline{W}_i$ is different for different terminals.

Again, the optimization in equation (11) is over all possible channel impulse responses $h_j$. The least square channel impulse response estimate $h_i^{ls}$ for terminal i is equal to the hypothesized response $h_j$ that results in the minimum error between the initial frequency response estimate $\hat{H}_i$ and the frequency response corresponding to $h_j$, which is given by $\overline{W}_i h_j$.

The solution to equation (11) may be expressed as:

$$\hat{h}_i^{ls} = (\overline{W}_i^H \overline{W}_i)^{-1} \overline{W}_i^H \hat{H}_i. \qquad \text{Eq(12)}$$

As shown in equation (12), the least square channel impulse response estimate $h_i^{ls}$ for terminal i may be derived based on the initial channel frequency response estimate $\hat{H}_i$, which is obtained based on the uplink pilot received on only the S subbands assigned to terminal i. In particular, the estimate $h_i^{ls}$ may be obtained by performing a least square operation (i.e., a pre-multiplication with $(\overline{W}_i^H \overline{W}_i)^{-1} \overline{W}_i^H$) on the initial estimate $\hat{H}_i$. The vector $h_i^{is}$ includes L entries for the L taps of the channel impulse response, where $L \leq S$.

An enhanced estimate of the frequency response of the wireless channel, $\hat{H}_i^{is}$, for terminal i may then be derived from the least square channel impulse response estimate $h_i^{is}$, as follows:

$$\hat{H}_i^{is} = W h_i^{is}, \qquad \text{Eq (13)}$$

where $\hat{H}_i^{is}$ is an (M×1) vector for the enhanced channel frequency response estimate for terminal i.

Equation (13) indicates that the enhanced channel frequency response estimate $\hat{H}_i^{is}$ for terminal i may be obtained for all M data subbands based on the least square channel impulse response estimate $h_i^{is}$ that includes only L entries, where typically $L \leq S < M \leq N$. The frequency response of the (M−S) subbands not assigned to terminal i is effectively interpolated by the computation described above.

Figure 4B:
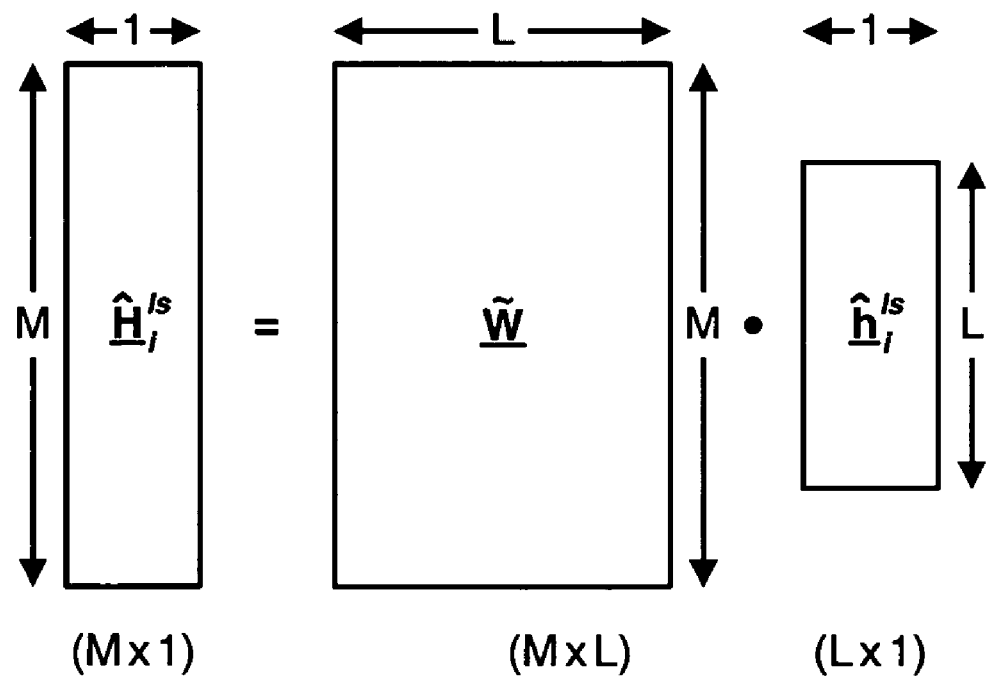
FIG. 4B shows derivation of the enhanced frequency response estimate based on an impulse response estimate derived from pilot transmission on the S assigned subband.

FIG. 4B graphically shows the relationship between the enhanced channel frequency response estimate $\hat{H}_i^{is}$ and the least square channel impulse response estimate $h_i^{is}$ for terminal i. The vector $h_i^{is}$ includes L time-domain values for the least square channel impulse response estimate for terminal i. This vector $h_i^{is}$ can be transformed to the frequency domain by pre-multiplying it with the DFT matrix W. The vector $\hat{H}_i^{is}$ includes M frequency-domain values for the complex gains for the M data subbands for terminal i.

The enhanced channel frequency response estimate $\hat{H}_i^{is}$ may be derived directly from the initial channel frequency response estimate $\hat{H}_i$, as follows:

$$\hat{H}_i^{is} = \tilde{W}(\overline{W}_i^H \overline{W}_i)^{-1} \overline{W}_i^H \hat{H}_i. \qquad \text{Eq (14)}$$

Equation (14) combines equations (12) and (13), and the derivation of the least square channel impulse response estimate $h_i^{is}$ is implicitly performed.

The quality of the enhanced estimate $\hat{H}_i^{is}$ is dependent on various factors, one of which is whether all or only a subset of the N total subbands is used for data transmission. Each of these two cases is analyzed separately below.

If all N subbands are used for data transmission (i.e., M=N), then the mean square error (MSE) of the enhanced channel frequency response estimate $\hat{H}_i^{is}$ for terminal i may be expressed as:

$$MSE = \frac{\sigma^2}{P_i} \text{trace} \left[ \underline{W}(\overline{W}_i^H \overline{W}_i)^{-1} \underline{W}^H \right] \qquad \text{Eq (15)}$$

$$= \frac{\sigma^2}{P_i} \sum_{q=1}^{L} \frac{1}{\lambda_q},$$

where $P_i$ is the transmit power used for the pilot symbol in each of the S subbands assigned to terminal i, and $\lambda_q$, for $q = \{1 \ldots L\}$, are the eigenvalues of $\underline{W}(\overline{W}_i^H \overline{W}_i)^{-1} \underline{W}^H$.

It can be shown that the MSE in equation (15) is the trace of the noise covariance matrix after the least square operation (i.e. the covariance matrix of $W(\overline{W}_i^H \overline{W}_i)^{-1} \overline{W}_i^H n_i$). It can also be shown that the MSE in equation (15) is minimized when the eigenvalues $\lambda_q$, for $q = \{1 \ldots L\}$, are all equal, which is the case if the least square operation does not color the noise vector $n_i$.

A sufficient condition to attain the minimum mean square error (MMSE) for the enhanced estimate $\hat{H}_i^{is}$ is to have $\overline{W}_i^H \overline{W}_i = I$, where I is the identity matrix. This condition can be met if (1) the number of subbands in each group is $S = 2^r \geq L$, where r is an integer so that S is a power of twos, and (2) the S subbands in each group are uniformly (i.e., equally) spaced. For such subband grouping and spacing, $\overline{W}_i$ is a DFT matrix of radix N/S, and hence $\overline{W}_i^H \overline{W}_i = I$. For this subband grouping and spacing, the MMSE of the enhanced channel frequency response estimate $\hat{H}_i^{is}$ for terminal i may be derived from equation (15) and expressed as:

$$MMSE = \frac{\sigma^2}{P_i} \left( \frac{NL}{S} \right). \qquad \text{Eq (16)}$$

It can be shown that the MSE for the enhanced estimate $\hat{H}_i^{is}$, which is obtained based on pilot transmission on only S assigned subbands, is the same as the MSE for a channel estimate $\hat{H}_n^{is}$, which is obtained based on pilot transmission on all N subbands, if the same amount of total power is used for pilot transmission. This can be achieved by increasing the transmit power for each of the S subbands assigned to terminal i, as follows:

$$P_i = \left( \frac{N}{S} \right) P_n, \qquad \text{Eq (17)}$$

where $P_n$ is the "average" transmit power for the N subbands.

The OFDM system may be operated in a frequency band that has a per MHz power constraint of P dBm/MHz. In this case, the total transmit power $P_{total}$ for each terminal is limited by P·W dBm (i.e., there is a total power constraint of $P_{total} \leq P \cdot W$ dBm). The average transmit power can then be given as $P_n = P_{total}/N$, and the power transmitted per subband will be $P_i = P_{total}/S$, if the spacing between consecutive subbands of the S subbands is less than 1 MHz. If the spacing between consecutive subbands is greater than 1 MHz, then the average power constraint may limit the total transmit power $P_{total}$ to less than P·W (i.e., $P^{total} \leq P \cdot W$), which may then result in degraded quality for the channel estimate (i.e., increased MSE in the channel estimate).

From the above analysis, the MSE of the channel estimate $\hat{H}_i^{is}$ obtained based on pilot transmission on only S subbands is the same as the MSE of the channel estimate obtained based on pilot transmission on all N subbands if the following conditions are satisfied:

1. Choose $S \geq Cp$ and $S \geq W$;
2. Uniform distribution of the S subbands in each group across the N total subbands; and
3. Set the transmit power N/S times higher for each of the S subbands in any given group.

As noted above, Cp denotes the length of the cyclic prefix appended to each transformed symbol to form a corresponding OFDM symbol and is selected such that $Cp \geq L$.

When the above conditions are met, then the MMSE is attained for the enhanced estimate $\hat{H}_i^{is}$, as long as $S \geq Cp$. To accommodate the maximum number of terminals, the groups may be defined such that only L subbands are included in each group, so that the maximum number of groups can be formed.

If only a subset of the N total subbands is used for data transmission (i.e., M<N), which is the case if some subbands are used for guard subbands, then the MMSE is attained only if S=M. If S<M, then the noise covariance matrix after the least square operation is colored and the MMSE cannot be attained for the enhanced estimate $\hat{H}_i^{is}$. The colored noise covariance matrix results in unequal eigenvalues for $W(\overline{W}_i^H \overline{W}_i)^{-1}W^H$, so that the eigenvalue spread $$\chi = \frac{\lambda_{q,\max}}{\lambda_{q,\min}}$$

is greater than 1. The spread $\chi$ is maximum (and hence the MSE is maximum) when S=Cp and $\chi$ gets closer to 1 if S≈1.1 Cp, resulting in an MSE that is closer to that in equation (16). Hence, for the case in which M<N, the MSE is minimized for the enhanced estimate $\hat{H}_i^{is}$ if the following conditions are satisfied:
1. Choose S≈1.1 Cp and S>W;
2. Uniformly distribute the S subbands in each group across the M data subbands; and
3. Set the transmit power N/S times higher for each of the S subbands in any given group.

FIG. 5 illustrates an embodiment of an OFDM subband structure 500 that supports subband multiplexing. In this embodiment, the M usable subbands are initially divided into S disjoint sets, with each set including Q consecutive subbands, where Q·S<M. The Q subbands in each set are assigned to the Q groups such that the i-th subband in each set is assigned to the i-th group. The S subbands in each group would then be uniformly distributed across the M usable subbands such that consecutive subbands in the group are separated by Q subbands. The M usable subbands may also be distributed to the Q groups in some other manners, and this is within the scope of the invention.

The Q groups of subbands may be assigned to up to Q terminals for uplink pilot transmission. Each terminal would then transmit a pilot only on its S assigned subbands. With subband multiplexing, up to Q terminals may simultaneously transmit pilots on the uplink on up to M usable subbands. This can greatly reduce the amount of overhead needed for uplink pilot transmission.

To allow the access point to obtain high quality channel estimates, each terminal may increase the transmit power per subband by a factor of Q. This would result in the total energy for the pilot transmission on the S assigned subbands to be the same as if all M data subbands were used for pilot transmission. The same total pilot energy would allow the access point to estimate the channel response for all M usable subbands based on pilot transmission on only a subset of these subbands with little or no loss in quality, as described above.

If subband multiplexing is used to permit simultaneous pilot transmission by multiple terminals, then the signals from nearby terminals may cause substantial interference to the signals from faraway terminals if all terminals transmit at full power. In particular, it can be shown that frequency offset among the terminals can result in inter-subband interference. This interference can cause degradation in the channel estimate derived from uplink pilots and/or increase the bit error rate of uplink data transmissions. To mitigate the effects of inter-subband interference, the terminals may be power controlled so that the nearby terminals do not cause excessive interference to faraway terminals.

The effect of interference from nearby terminals was investigated, and it was found that power control may be applied coarsely to mitigate inter-subband interference. In particular, it was found that if the maximum frequency offset among the terminals is 300 Hz or less in the case of the exemplary system with 256 total subbands in a 20 MHz channel, and Q=12, then by limiting the received signal-to-noise ratios (SNRs) of the nearby terminals to 40 dB or less, there would be a loss of 1 dB or less in the SNRs of the other terminals. If the frequency offset among the terminals is 1000 Hz or less, then the SNRs of the nearby terminals should be limited to 27 dB to ensure 1 dB or less of loss in the SNRs of the other terminals. If the SNR needed to achieve the highest rate supported by an OFDM system is less than 27 dB (40 dB), then limiting the SNR of each terminal to 27 dB or less (or 40 dB or less) would not have any impact on the maximum supported rate for the nearby terminals.

The coarse power control requirements stated above may be achieved with a slow power control loop. For example, control messages may be sent when and as needed to adjust the uplink power of nearby terminals (e.g., when the power level changes due to movement by these terminals). Each terminal may be informed of the initial transmit power level to use for the uplink as part of a call setup procedure when accessing the system.

The groups of subbands may also be assigned to the terminals in a manner to mitigate the effect of inter-subband interference. In particular, terminals with high received SNRs may be assigned subbands that are near each other. Terminals with low received SNRs may be assigned subbands that are also near each other, but away from the subbands assigned to the terminals with high received SNRs.

Certain benefits may be obtained from the subband grouping and uniform subband spacing described above. However, other channel grouping and spacing schemes may also be used, and this is within the scope of the invention. In general, the groups may include the same or different number of subbands, and the subbands in each group may be uniformly or non-uniformly distributed across the M usable subbands.

Figure 6:
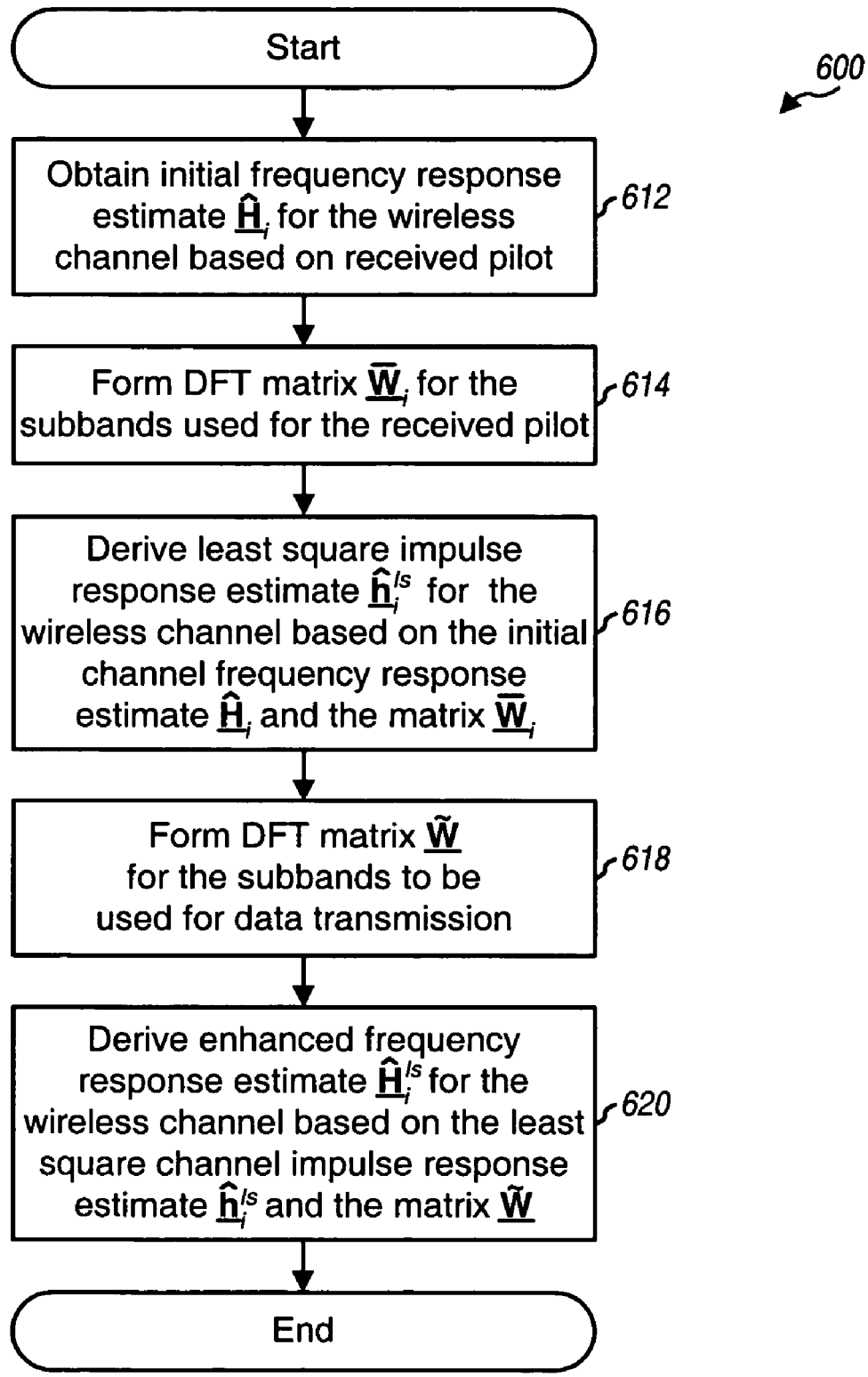
FIG. 6 shows a process for estimating the frequency response of the wireless channel.

FIG. 6 is a flow diagram of an embodiment of a process 600 for estimating the frequency response of a wireless channel. Process 600 provides an enhanced channel frequency response estimate for all M data subbands based on pilot transmission received on S assigned subbands, where S≦M. This process may be performed by an access point for each of a number of terminals based on uplink pilot transmissions, where S is typically less than M (i.e., S<M). This process may also be performed by a terminal based on a downlink pilot transmission, where S may be less than or equal to M (i.e., S≦M).

An initial estimate of the frequency response of the wireless channel, $\hat{H}_i$, is first obtained for the S assigned subbands based on the pilot received on these S subbands, as shown in equation (10) (step 612). The DFT matrix $\overline{W}_i$ is then formed and includes the first L columns of the matrix W and the S rows of the matrix W corresponding to the S subbands used for pilot transmission (step 614).

A least square estimate of the impulse response of the wireless channel, $h_i^{is}$, is then derived based on the initial channel frequency response estimate $\hat{H}_i$ and the matrix $\overline{W}_i$, as shown in equation (12) (step 616). The DFT matrix W is next formed and includes the first L columns of the matrix W and the M rows of the matrix W corresponding to the M data subbands (step 618). In general, the matrix W can include any combination of rows for any group of subbands for which the frequency response is desired.

An enhanced estimate of the frequency response of the wireless channel, $\hat{H}_i^{is}$, is then derived based on the least square channel impulse response estimate $h_i^{is}$ and the matrix W, as shown in equation (13) (step 620). The vector $\hat{H}_i^{is}$ includes the complex gains for all subbands covered by the matrix W. The derivations for steps 616 and 620 may be combined, as described above and shown in equation (14).

Figure 7:
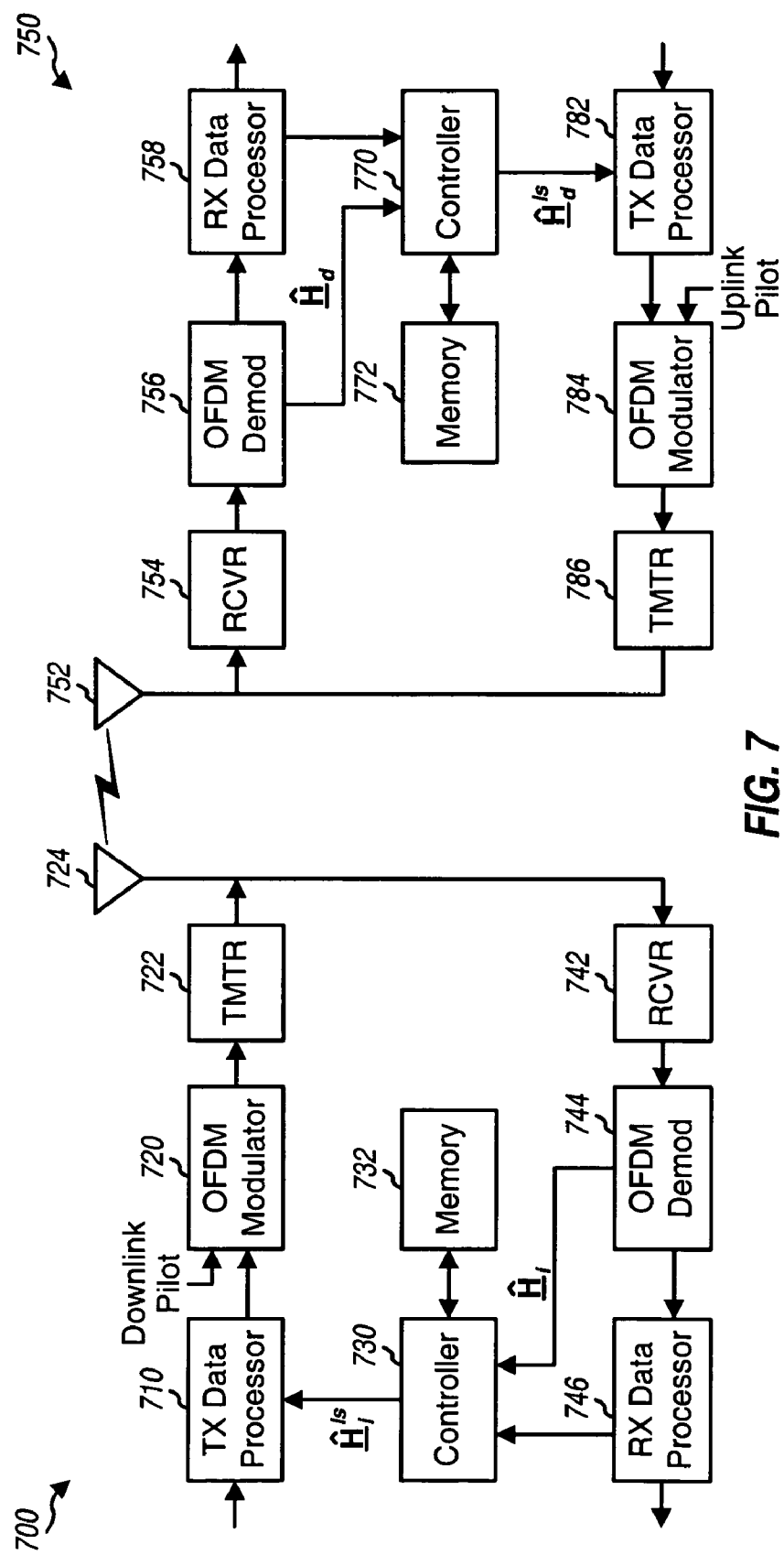
FIG. 7 shows a block diagram of an access point and a terminal.

FIG. 7 is a block diagram of an embodiment of an access point 700 and a terminal 750, which are capable of performing channel estimation described herein.

On the downlink, at access point 700, traffic data is provided to a TX data processor 710, which formats, codes, and interleaves the traffic data to provide coded data. An OFDM modulator 720 then receives and processes the coded data and pilot symbols to provide a stream of OFDM symbols. The processing by OFDM modulator 720 may include (1) symbol mapping the coded data to form modulation symbols, (2) multiplexing the modulation symbols with pilot symbols, (3) transforming the modulation symbols and pilot symbols to obtain transformed symbols, and (4) appending a cyclic prefix to each transformed symbol to form a corresponding OFDM symbol. For the downlink, the pilot symbols may be multiplexed with the modulation symbols using, for example, time division multiplexing (TDM). For TDM, the pilot and modulation symbols are transmitted on different time slots. The pilot symbols may be transmitted on all M usable subbands or a subset of these subbands.

A transmitter unit (TMTR) 722 then receives and converts the stream of OFDM symbols into one or more analog signals and further conditions (e.g., amplifies, filters, and frequency upconverts) the analog signals to generate a downlink modulated signal suitable for transmission over the wireless channel. The modulated signal is then transmitted via an antenna 724 to the terminals.

At terminal 750, the downlink modulated signal is received by antenna 752 and provided to a receiver unit (RCVR) 754. Receiver unit 754 conditions (e.g., filters, amplifies, and frequency downconverts) the received signal and digitizes the conditioned signal to provide samples. An OFDM demodulator 756 then removes the cyclic prefix appended to each OFDM symbol, transforms each recovered transformed symbol using an FFT, and demodulates the recovered modulation symbols to provide demodulated data. An RX data processor 758 then decodes the demodulated data to recover the transmitted traffic data. The processing by OFDM demodulator 756 and RX data processor 758 is complementary to that performed by OFDM modulator 720 and TX data processor 710, respectively, at access point 700.

OFDM demodulator 756 may further determine the initial channel frequency response estimate $\hat{H}_d$ or provide the received pilot symbols that may be used to derive $\hat{H}_d$. A controller 770 receives $\hat{H}_d$ (or equivalent information), determines the least square channel impulse response estimate $h_d^{is}$ based on $\hat{H}_d$, and further obtains the enhanced channel frequency response estimate $\hat{H}_d^{is}$ based on $h_d^{is}$. The enhanced estimate $\hat{H}_d^{is}$ may thereafter be used for uplink data transmission.

On the uplink, traffic data is processed by a TX data processor 782 and provided to an OFDM modulator 784, which also receives pilot symbols. OFDM modulator 784 may then process the coded data and pilot symbols similar to that described for OFDM modulator 720. For the uplink, the pilot symbols may also be multiplexed with the modulation symbols using TDM. Moreover, the pilot symbols may be transmitted on only S subbands assigned to terminal 750 during time slots designated for pilot transmission.

A transmitter unit 786 then receives and processes the stream of OFDM symbols to generate an uplink modulated signal suitable for transmission over the wireless channel. The modulated signal is then transmitted via an antenna 752 to the access point.

At access point 700, the uplink modulated signal is processed by a receiver unit 742 to provide samples. These samples are then processed by an OFDM demodulator 744 to provide demodulated data, which are further processed by an RX data processor 746 to recover the transmitted traffic data. OFDM demodulator 744 may determine the initial channel frequency response estimate $\hat{H}_i$ for each designated terminal or provide the received pilot symbols that may be used to obtain $\hat{H}_i$. A controller 730 receives $\hat{H}_i$ (or equivalent information), determines the least square channel impulse response $h_i^{is}$ for designated active terminal based on $\hat{H}_i$, and further obtains the enhanced channel frequency response estimate $\hat{H}_i^{is}$ based on $h_i^{is}$. The enhanced estimate $\hat{H}_i^{is}$ may thereafter be used for downlink data transmission to the terminal.

Controllers 730 and 770 direct the operation at the access point and terminal, respectively. Memory units 732 and 772 provide storage for program codes and data used by controllers 730 and 770, respectively.

The channel estimation techniques described herein may be implemented by various means. For example, these techniques may be implemented in hardware, software, or a combination thereof. For a hardware implementation, the elements used to implement any one or a combination of the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the channel estimation techniques may be implemented with modules (e.g., procedures, functions, and so on) that perform the functions described herein. The software codes may be stored in a memory unit (e.g., memory units 732 or 772 in FIG. 7) and executed by a processor (e.g., controller 730 or 770). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for estimating a frequency response of a wireless communication channel, the method comprising:
   estimating the frequency response of the wireless communication channel based on a subset of a plurality of available tones, wherein the subset comprises a plurality of equally spaced tones, the equally spaced tones being equally spaced by a spacing number of the plurality of available tones between the equally spaced tones,
   wherein the estimating comprises:
   using a received power equal to P*N/S, where P is an average received power for the plurality of available tones, N is a total available tone number and S is a subset number indicating the subset number of tones in the subset.

2. A method for estimating a frequency response of a wireless communication channel, the method comprising:
  estimating the frequency response of the wireless communication channel based on a subset of a plurality of available tones, wherein the subset comprises a plurality of equally spaced tones, the equally spaced tones being equally spaced by a spacing number of the plurality of available tones between the equally spaced tones,
  wherein the subset comprises a subset number S of the plurality of available tones, wherein $S=2^r$, wherein r is an integer.

3. A wireless communication access point comprising:
  a receiver configured to receive a wireless communication signal in a wireless communication channel; and
  a processor coupled to the receiver and configured to estimate a frequency response of the wireless communication channel based on a subset of a plurality of available tones, wherein the subset comprises a plurality of equally spaced tones, the equally spaced tones being equally spaced by a spacing number of the plurality of available tones between the equally spaced tones,
  wherein the processor is further configured to use a received power equal to P*N/S for estimating the frequency response, where P is an average received power for the plurality of available tones, N is a total available tone number and S is a subset number indicating the subset number of tones in the subset.

4. A wireless communication access point comprising:
  a receiver configured to receive a wireless communication signal in a wireless communication channel; and
  a processor coupled to the receiver and configured to estimate a frequency response of the wireless communication channel based on a subset of a plurality of available tones, wherein the subset comprises a plurality of equally spaced tones, the equally spaced tones being equally spaced by a spacing number of the plurality of available tones between the equally spaced tones,
  wherein the subset comprises a subset number S of the plurality of available tones, wherein $S=2^r$, wherein r is an integer.

5. A wireless communication access point comprising:
  a receiving means for receiving a wireless communication signal in a wireless communication channel; and
  a processing means for estimating a frequency response of the wireless communication channel based on a subset of a plurality of available tones, wherein the subset comprises a plurality of equally spaced tones, the equally spaced tones being equally spaced by a spacing number of the plurality of available tones between the equally spaced tones, the processing means coupled to the receiving means,
  wherein the processing means is further configured to use a received power equal to P*N/S, where P is an average received power for the plurality of available tones, N is a total available tone number and S is a subset number indicating the subset number of tones in the subset for estimating the frequency response.

6. A wireless communication access point comprising:
  a receiving means for receiving a wireless communication signal in a wireless communication channel; and
  a processing means for estimating a frequency response of the wireless communication channel based on a subset of a plurality of available tones, wherein the subset comprises a plurality of equally spaced tones, the equally spaced tones being equally spaced by a spacing number of the plurality of available tones between the equally spaced tones the processing means coupled to the receiving means,
  wherein the subset comprises a subset number S of the plurality of available tones, wherein $S=2^r$, wherein r is an integer.

7. A computer readable medium embodying instructions for performing a method for estimating a frequency response of a wireless communication channel, the method comprising:
  estimating the frequency response of the wireless communication channel based on a subset of a plurality of available tones, wherein the subset comprises a plurality of equally spaced tones, the equally spaced tones being equally spaced by a spacing number of the plurality of available tones between the equally spaced tones,
  wherein the estimating comprises:
  using a received power equal to P*N/S, where P is an average received power for the plurality of available tones, N is a total available tone number and S is a subset number indicating the subset number of tones in the subset.

8. A computer readable medium embodying instructions for performing a method for estimating a frequency response of a wireless communication channel, the method comprising:
  estimating the frequency response of the wireless communication channel based on a subset of a plurality of available tones, wherein the subset comprises a plurality of equally spaced tones, the equally spaced tones being equally spaced by a spacing number of the plurality of available tones between the equally spaced tones,
  wherein the subset comprises a subset number S of the plurality of available tones, wherein $S=2^r$, wherein r is an integer.

9. A method of selecting a pilot signal for a pilot transmission from a wireless communication terminal, the method comprising:
  selecting for the pilot transmission a subset of a plurality of available tones, wherein the subset comprises a plurality of equally spaced tones, the equally spaced tones being equally spaced by a spacing number of the plurality of available tones between the equally spaced tones; and
  selecting a transmit power P equal to T*N/S, where T is an average power for the plurality of available tones, N is a total available tone number and S is a subset number indicating the subset number of tones in the subset.

10. A method of selecting a pilot signal for a pilot transmission from a wireless communication terminal, the method comprising:
  selecting for the pilot transmission a subset of a plurality of available tones, wherein the subset comprises a plurality of equally spaced tones, the equally spaced tones being equally spaced by a spacing number of the plurality of available tones between the equally spaced tones,
  wherein the subset comprises a subset number S of the plurality of available tones, wherein $S=2^r$, wherein r is an integer.

11. A wireless communication terminal comprising:
  a processor configured to select for a pilot transmission a subset of a plurality of available tones, wherein the subset comprises a plurality of equally spaced tones, the equally spaced tones being equally spaced by a spacing number of the plurality of available tones between the equally spaced tones; and
  a transmitter coupled to the processor, the transmitter configured to transmit the pilot transmission over the air, wherein the processor is further configured to select a transmit power P equal to T*N/S, where T is an average power for the plurality of available tones, N is a total available tone number and S is a subset number indicating the subset number of tones in the subset.

12. A wireless communication terminal comprising:
a processor configured to select for a pilot transmission a subset of a plurality of available tones, wherein the subset comprises a plurality of equally spaced tones, the equally spaced tones being equally spaced by a spacing number of the plurality of available tones between the equally spaced tones; and
a transmitter coupled to the processor the transmitter configured to transmit the pilot transmission over the air,
wherein the subset comprises a subset number S of the plurality of available tones, wherein $S=2^r$, wherein r is an integer.

13. A wireless communication terminal comprising:
a processing means for selecting for a pilot transmission a subset of a plurality of available tones, wherein the subset comprises a plurality of equally spaced tones, the equally spaced tones being equally spaced by a spacing number of the plurality of available tones between the equally spaced tones; and
a transmitting means for transmitting the pilot transmission over the air, the transmitting means coupled to the processing means,
wherein the processing means is further configured to select a transmit power P equal to T*N/S, where T is an average power for the plurality of available tones, N is a total available tone number and S is a subset number indicating the subset number of tones in the subset.

14. A wireless communication terminal comprising:
a processing means for selecting for a pilot transmission a subset of a plurality of available tones, wherein the subset comprises a plurality of equally spaced tones, the equally spaced tones being equally spaced by a spacing number of the plurality of available tones between the equally spaced tones; and
a transmitting means for transmitting the pilot transmission over the air, the transmitting means coupled to the processing means,
wherein the subset comprises a subset number S of the plurality of available tones, wherein $S=2^r$, wherein r is an integer.

15. A computer readable medium embodying instructions for performing a method for selecting a pilot signal for a pilot transmission from a wireless communication terminal, the method comprising:
selecting for the pilot transmission a subset of a plurality of available tones, wherein the subset comprises a plurality of equally spaced tones, the equally spaced tones being equally spaced by a spacing number of the plurality of available tones between the equally spaced tones; and
selecting a transmit power P equal to T*N/S, where T is an average power for the plurality of available tones, N is a total available tone number and S is a subset number indicating the subset number of tones in the subset.

16. A computer readable medium embodying instructions for performing a method for selecting a pilot signal for a pilot transmission from a wireless communication terminal, the method comprising:
selecting for the pilot transmission a subset of a plurality of available tones, wherein the subset comprises a plurality of equally spaced tones, the equally spaced tones being equally spaced by a spacing number of the plurality of available tones between the equally spaced tones,
wherein the subset comprises a subset number S of the plurality of available tones, wherein $S=2^r$, wherein r is an integer.

* * * * *